US010734123B2

(12) United States Patent
Cinotti et al.

(10) Patent No.: US 10,734,123 B2
(45) Date of Patent: Aug. 4, 2020

(54) PASSIVE SYSTEM FOR EVACUATING THE RESIDUAL HEAT FROM A NUCLEAR REACTOR

(71) Applicants: HYDROMINE NUCLEAR ENERGY S.A.R.L., Luxembourg (FR); AGENZIA NAZIONALE PER LE NUOVE TECNOLOGIE, L'ENERGIA E LO SVILUPPO ECONOMICO SOSTENIBILE (ENEA), Rome (IT)

(72) Inventors: Luciano Cinotti, Recco (IT); Pietro Agostini, Rome (IT); Mariano Tarantino, Rome (IT)

(73) Assignees: AGENZIA NAZIONALE PER LE NUOVE TECNOLOGIE, L'ENERGIA E LO SVILUPPO ECONOMICO SOSTENIBLE (ENEA), Rome (IT); HYDROMINE NUCLEAR ENERGY S.A.R.L., Luxembourg (LU)

( * ) Notice: Subject to any disclaimer, the term of this patent is extended or adjusted under 35 U.S.C. 154(b) by 548 days.

(21) Appl. No.: 15/303,943

(22) PCT Filed: Apr. 17, 2015

(86) PCT No.: PCT/IB2015/052829
§ 371 (c)(1),
(2) Date: Oct. 13, 2016

(87) PCT Pub. No.: WO2015/159273
PCT Pub. Date: Oct. 22, 2015

(65) Prior Publication Data
US 2017/0040071 A1 Feb. 9, 2017

(30) Foreign Application Priority Data
Apr. 18, 2014 (IT) .............................. MI2014A0737

(51) Int. Cl.
*G21C 9/00* (2006.01)
*G21C 15/18* (2006.01)
(Continued)

(52) U.S. Cl.
CPC ............ *G21C 15/18* (2013.01); *F16K 31/002* (2013.01); *G21C 1/03* (2013.01); *Y02E 30/40* (2013.01)

(58) Field of Classification Search
CPC ........ G21C 15/00; G21C 15/18; G21C 15/24; G21C 15/26; G21C 15/28; G21D 3/12; G21D 3/14
See application file for complete search history.

(56) References Cited

U.S. PATENT DOCUMENTS

2007/0028964 A1    2/2007   Vasquez et al.
2009/0245453 A1   10/2009  Jeong et al.
(Continued)

FOREIGN PATENT DOCUMENTS

EP    1078376    11/2007
FR    2956728    8/2011
(Continued)

OTHER PUBLICATIONS

International Search Report and Written Opinion from International Application No. PCT/IB2015/052829 dated Jul. 31, 2015.

*Primary Examiner* — Marshall P O'Connor
(74) *Attorney, Agent, or Firm* — Dorsey & Whitney LLP

(57) ABSTRACT

A system for evacuating the residual heat from a nuclear reactor comprises: a first heat exchanger, which transfers heat from a primary fluid of the reactor to a secondary fluid; a second heat exchanger, where the secondary fluid is cooled by an auxiliary fluid which crosses a cooling duct; and a control portion, subject to thermal expansion by effect of the heating, induced by an increase in the temperature of the (Continued)

primary fluid beyond a preset threshold, of the secondary fluid in the control portion; the control portion being connected to a mechanical actuator device moved by the thermal expansion of the control portion to open the cooling duct and allow the passage of auxiliary fluid into the cooling duct and through the second heat exchanger.

18 Claims, 3 Drawing Sheets

(51) Int. Cl.
     *F16K 31/00*     (2006.01)
     *G21C 1/03*      (2006.01)

(56) References Cited

U.S. PATENT DOCUMENTS

| | | |
|---|---|---|
| 2010/0124303 A1 | 5/2010 | Young et al. |
| 2010/0177860 A1* | 7/2010 | Eoh .................. G21C 15/18 376/299 |
| 2013/0266111 A1 | 10/2013 | Young et al. |

FOREIGN PATENT DOCUMENTS

| | | |
|---|---|---|
| JP | H08184691 A | 7/1996 |
| JP | 2004020376 A | 1/2004 |

* cited by examiner

PASSIVE SYSTEM FOR EVACUATING THE RESIDUAL HEAT FROM A NUCLEAR REACTOR

TECHNICAL FIELD

The present invention concerns a system, namely a passive system, for evacuating the residual heat from a nuclear reactor.

BACKGROUND ART

It is known that in nuclear reactors there is the need to evacuate the residual heat after the reactor has stopped. For safety reasons, the systems for evacuating the residual heat must be particularly reliable and preferably diversified.

In the past active systems were mostly used, i.e. systems that require electrical energy for operation, whereas today passive systems are increasingly used, i.e. systems that do not require electrical energy for their operation, but nevertheless require the intervention of an operator or control logics and electrical power supplies to become operative.

DISCLOSURE OF INVENTION

One object of the present invention is to provide a system for evacuating the residual heat from a nuclear reactor which does not require power supplies for operation and which becomes operative independently of the operator or process logics, when the temperature of the reactor exceeds a preset reference value.

The present invention therefore relates to a system for evacuating the residual heat from a nuclear reactor as defined in essential terms in the attached claim 1 and, in its additional characteristics, in the dependent claims.

The system for evacuating the residual heat according to the invention is therefore a completely passive system, which does not require power supplies for its operation, or actuation by an operator or by a control logic.

BRIEF DESCRIPTION OF THE DRAWINGS

The invention is described in the following non-limiting implementation examples, with reference to the figures of the accompanying drawings, in which.

BEST MODE FOR CARRYING OUT THE INVENTION

Figure 1:
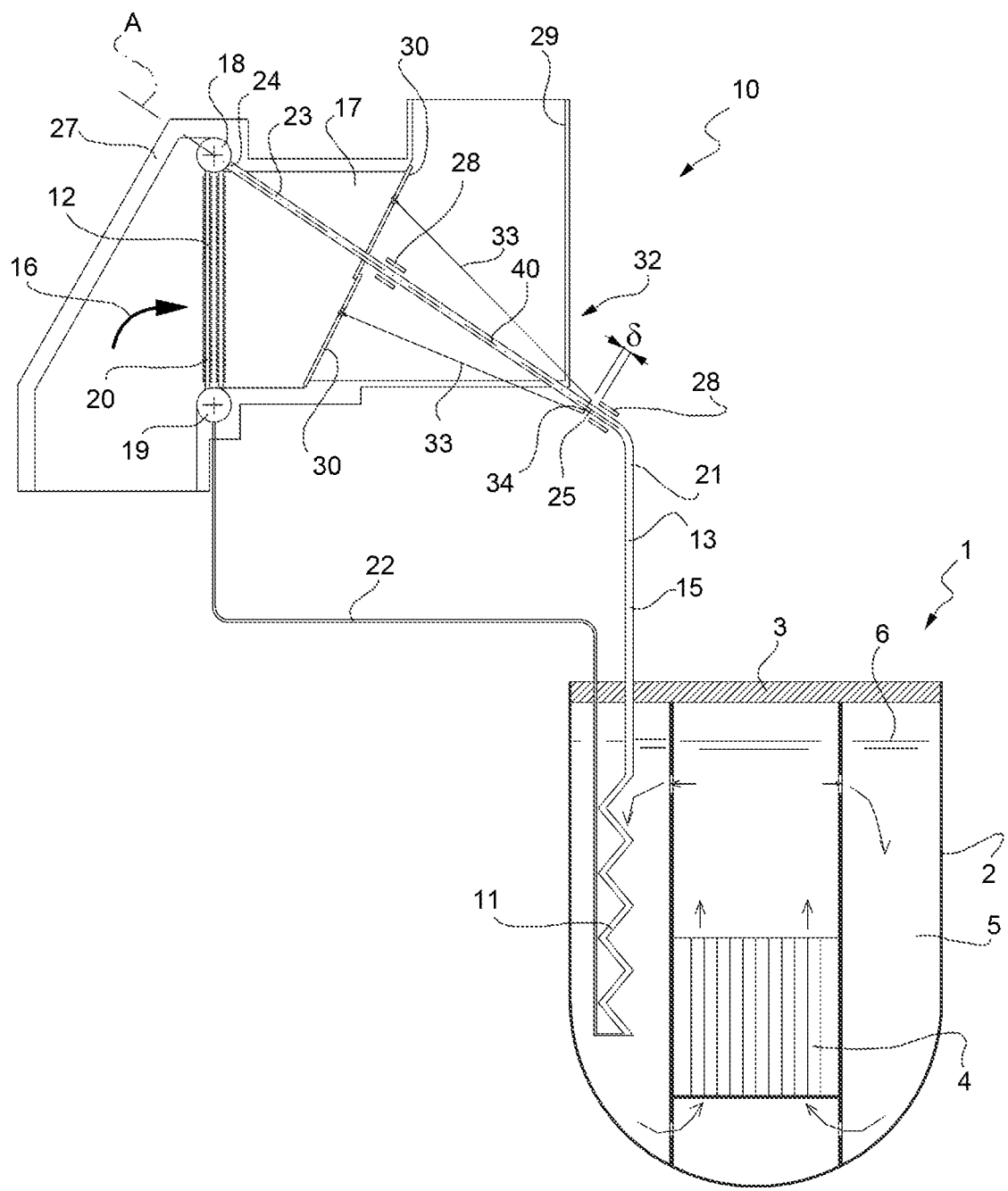
FIG. 1 is a schematic view of a nuclear reactor provided with a system for evacuating the residual heat according to the invention.

FIG. 1 shows, in an extremely schematic form, a nuclear reactor 1, of a type substantially known per se.

The reactor 1 comprises a vessel 2 covered by a roof 3; inside the vessel 2 a core 4 is arranged cooled by a primary fluid 5 (consisting for example of sodium, lead, lead-bismuth eutectic or molten salts), which fills the vessel 2 up to a free surface 6; the vessel 2 also houses primary heat exchangers (known and not illustrated) which transfer to the outside, via a circuit in which a secondary cooling fluid circulates, the power generated in the core 4, and other components not shown since they are not relevant to the present invention.

The reactor 1 is provided with a residual heat evacuation system 10, comprising at least one first heat exchanger 11 housed in the vessel 2, and at least one second heat exchanger 12 positioned on the outside of the vessel 2 and at a higher level (i.e. higher up) of the heat exchanger 11 and connected to the heat exchanger 11 by an evacuation circuit 13.

Preferably, several heat exchangers 11 are housed angularly spaced in the vessel 2, although below reference is made to one single heat exchanger 11 for the sake of simplicity.

The heat exchanger 11 interacts with the primary fluid 5, being in particular immersed in the primary fluid 5, for transferring heat from the primary fluid 5 to a secondary fluid 15 circulating in the evacuation circuit 13 and in the heat exchangers 11, 12. The heat exchanger 11 can be a heat exchanger of known type, for example a bayonet tube exchanger or a helical coil exchanger.

The heat exchanger 11 is connected to the heat exchanger 12, positioned on the outside of the vessel 2 at a higher level (i.e. higher up) with respect to the heat exchanger 11, via the evacuation circuit 13 in which the secondary fluid circulates 15.

In the heat exchanger 12 the secondary fluid 15 is cooled by an auxiliary fluid 16 (schematically represented by the arrow in FIG. 1), which circulates in a cooling duct 17 and crosses or strikes the heat exchanger 12. Also the heat exchanger 12 can be of known type; preferably, the heat exchanger 12 has an upper hot manifold 18, a lower cold manifold 19 and a plurality of pipes 20 (preferably finned pipes) arranged between the manifolds 18, 19.

The evacuation circuit 13 comprises a hot branch 21, which connects an outlet of the heat exchanger 11 with an inlet of the hot manifold 18 of the heat exchanger 12; and a cold branch 22, which connects an outlet of the cold manifold 19 of the heat exchanger 12 to an inlet of the heat exchanger 11.

The hot branch 21 comprises in particular a straight (rectilinear) pipe portion 23 which projects from the manifold 18 and extends along a rectilinear axis A between two opposite axial ends 24, 25, namely between one proximal end 24, fixed to the manifold 18 by means of a connection 26, and a distal end 25.

The manifold 18 is fixed to a containing and supporting structure 27 so as to constitute a fixed point of the system 10. In particular, the manifold 18 is secured to the structure 27 in the vicinity of the connection 26 with the pipe portion 23. The pipe portion 23 is housed axially sliding in transverse guides 28; the pipe portion 23 is mechanically constrained to run along its axis A by means of the guides 28. The pipe portion 23 is designed so as to be thermally expandable, in particular by effect of a temperature increase in the secondary fluid 15 circulating in it, along the axis A, within the transverse guides 28; since the proximal end 24 is fixed to the manifold 18, in the event of thermal expansion, the pipe portion 23 expands longitudinally, along the axis A, and the distal end 25 moves with respect to the proximal end 24 along the axis A. Advantageously, the evacuation circuit 13 is sealed and valveless.

In the non-limiting example of FIG. 1, the auxiliary fluid which cools the heat exchanger 12 is air in natural circulation in the cooling duct 17. In particular, the heat exchanger 12 is inserted along the cooling duct 17, which is defined for example within the structure 27 that houses and supports also the heat exchanger 12; the cooling duct 17 is advantageously connected to a chimney 29, adapted to release heat to the outside air. The cooling duct 17 is provided with one or more shutters 30 which intercept the air stream that flows through the cooling duct 17; the shutters 30 are arranged, in particular, between the heat exchanger 12 and the chimney 29.

Figure 2:
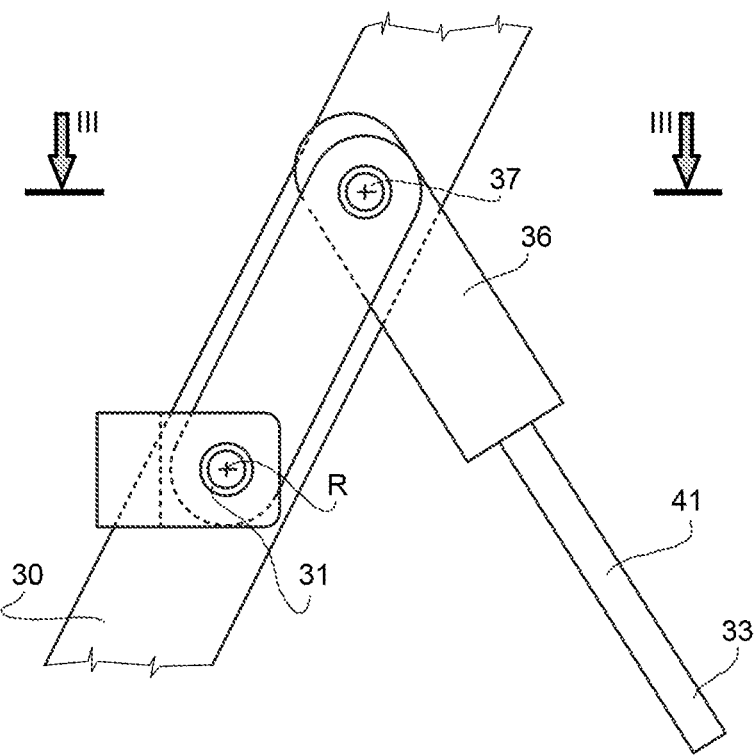
FIG. 2 is a schematic view on an enlarged scale, with parts removed for clarity, of a detail of the residual heat evacuation system of FIG. 1.
Figure 3:
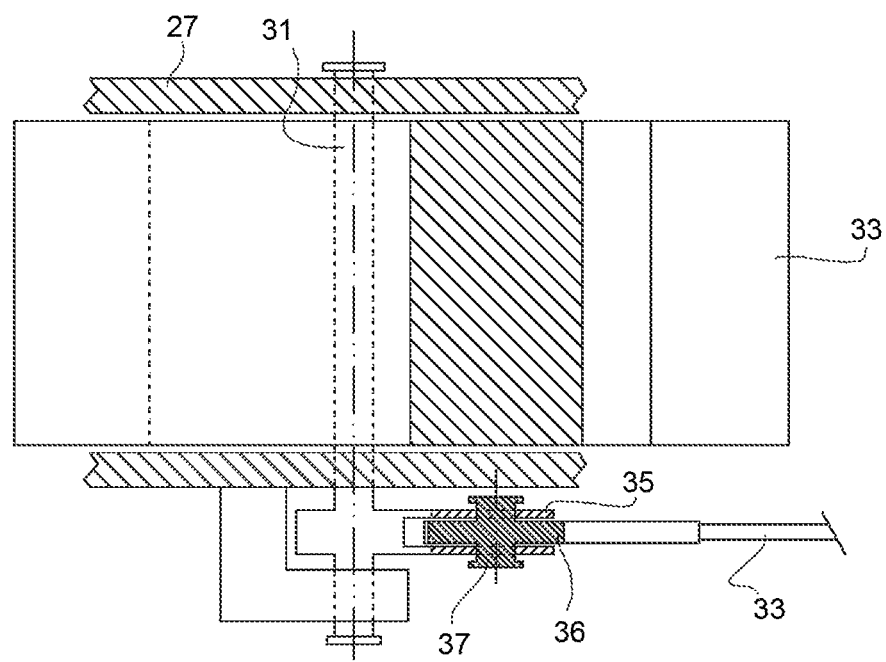
FIG. 3 is a cross section view, according to the projective plane III-III, of the detail of FIG. 2.

With reference also to FIGS. 2 and 3, the shutters 30 rotate about respective rotation axes R to progressively open the cooling duct 17, starting from a closing position in which the shutters 30 occlude the cooling duct 17.

For example, the shutters 30 are mounted on respective rotation shafts 31, hinged to the structure 27 and defining respective rotation axes R. Advantageously, each shaft 31 is offset with respect to the centre of gravity of the respective shutter 30, which is generically installed inclined with respect to a vertical plane. The distal end 25 of the pipe portion 23 is connected to a mechanical actuator device 32. In particular, the actuator device 32 includes tie rods 33, which extend along respective longitudinal axes and are mechanically connected, at respective opposite longitudinal ends, to the distal end 25 of the pipe portion 23 and to respective shutters 30. In particular, the tie rods 33 are connected to the pipe portion 23 by means of a hook 34, positioned at the distal end 25 and connected integrally to the pipe portion 23.

Each shutter 30 pivots integrally with the respective shaft 31 with respect to the structure 27. A first rod 35 is integrally connected to the shaft 31 (and also to the shutter 30). A second rod 36 is hinged on the rod 35 with which it forms, indicatively, a right angle. A pinion 37 is connected to the rod 35 to form, together with the shaft 31 and the rods 35, 36, a connecting rod-crank assembly. The rod 36 is oriented along the longitudinal axis of the tie rod 33.

Operation of the system 10 is as follows.

During normal operation of the reactor 1, the shutters 30 are closed and occlude the cooling duct 17, preventing the circulation of air in the cooling duct 17 and through the heat exchanger 12. Due to inevitable air leaks through the shutters and heat losses through the structure 27, the heat exchanger 12 slightly cools the secondary fluid 15, which by variation of density is induced to circulate in natural circulation in the evacuation circuit 13 supplying the heat exchanger 11 via the cold branch 22. The heat exchanger 11 positioned in the vessel 2 heats the secondary fluid 15 to a temperature near that of the primary fluid 5; the secondary fluid 15 then reaches the hot manifold 18 of the heat exchanger 12 circulating through the hot branch 21 of the evacuation circuit 13 and in particular flowing through the pipe portion 23.

In the event of increase in the temperature of the primary fluid 5 beyond a preset calibration threshold, also the secondary fluid 15 heats in the heat exchanger 11; the secondary fluid 15 consequently heats the pipe portion 23 which, since the manifold 18 is a fixed point of the system 10, by thermal expansion causes a movement 6 along the axis A of the hook 34 in which the tie rods 33 are integrally connected to the pipe portion 23. The pipe portion 23 therefore defines a thermally expandable control portion 40, in particular longitudinally extendible by thermal expansion; the longitudinal expansion of the pipe portion 23, i.e. of the control portion 40, which intervenes when the temperature of the primary fluid 5 exceeds the preset threshold, operates the actuator device 32 to move the shutters 30, which define respective movable members 41 to selectively open/close the cooling duct 17. In particular, the movement 6 of each tie rod 33 operates the pinion 37 which in turn induces a rotation of the rod 35, of the shaft 31 and then of the shutter 30, beginning opening of the shutter 30. The greater the temperature increase of the primary fluid 5, the greater the opening of the shutters 30 and the evacuation of heat by the auxiliary fluid 16 (in this case, air).

The subsequent cooling of the primary fluid 5 is followed by a corresponding closing of the shutters 30 by effect of gravity, due to the dissymmetry in positioning of the shafts 31 (and therefore of the rotation axes R) of the shutters 30 with respect to the respective centres of gravity of the shutters 30.

The system 10 therefore allows temperature regulation of the primary fluid 5 without the need for interventions by the operator or regulation logics.

According to one of the preferred solutions in the ambit of the present invention, especially suited to application in lead-bismuth or pure lead cooled reactors, water is initially introduced into the evacuation circuit 13 in a quantity such as to reach a preset design pressure for boiling inside the heat exchanger 11; the evacuation circuit 13 is subsequently sealed. With the shutters 30 closed, the evacuation circuit 13 is substantially full of pressurised superheated steam, which enters the heat exchanger 12; in the heat exchanger 12, the secondary fluid 15, in the form of superheated steam, is cooled to saturation temperature with the formation of a small condensate flow which returns, through the cold branch 22 of the evacuation circuit 13, to the heat exchanger 11. As the superheating temperature of the steam at the outlet of the heat exchanger 11 increases and the shutters 30 progressively open, the formation of condensate in the heat exchanger 12 increases, with consequent increase in the power of the heat exchanger 11. Consequent to increase of the formation of condensate is the reduction in the pressure of the secondary fluid 15 and the increase in the density difference between the condensate circulating in the cold branch 22 and the superheated steam circulating in the hot branch 21, with the effect of improving the natural circulation performance. Since the evacuation circuit 13 is filled with steam only, the corresponding mass is very limited, therefore, even in the case of breakage of a tube of the heat exchanger 11, the mass of water-steam released inside the reactor 1 is limited and without important consequences in terms of safety. The possibility of sealing the evacuation circuit 13 and eliminating all types of valve further increases the dependability of the system 10.

Figure 4:
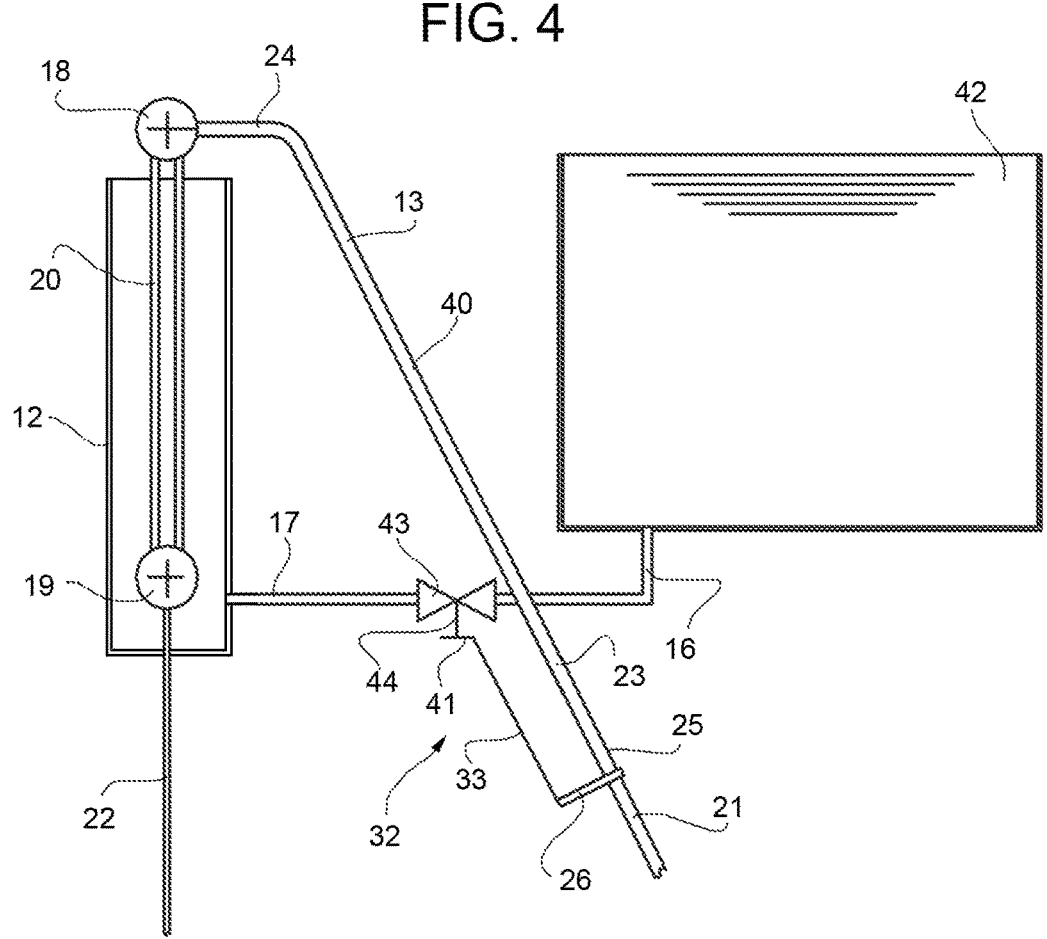
FIGS. 4 and 5 are respective partial schematic views, with parts omitted for clarity, of two variations of the residual heat evacuation system of FIG. 1.

In the variation of FIG. 4, in which details which are similar or identical to those already described are indicated by the same numbers, the auxiliary fluid 16 circulating in the cooling duct 17 and which cools the heat exchanger 12 is a liquid, for example water. The cooling duct 17 connects a tank 42, containing the auxiliary fluid 16, to the heat exchanger 12. A valve 43 is positioned along the cooling duct 17.

The actuator device 32 comprises a movable member 41 consisting of a shutter 44 of the valve 43 and connected to a tie rod 33, which is connected to the pipe portion 23 by means of the hook 34, positioned at the end 25.

In this case, the longitudinal movement of the hook 34 (caused by the thermal expansion of the pipe portion 23, i.e. of the control portion 40, again induced by the temperature increase of the primary fluid 5 and, consequently, of the secondary fluid 15) drags the shutter 44 and opens the valve 43; the auxiliary fluid 16 is thus discharged from the tank 42, by the effect of gravity, into the heat exchanger 12.

Figure 5:
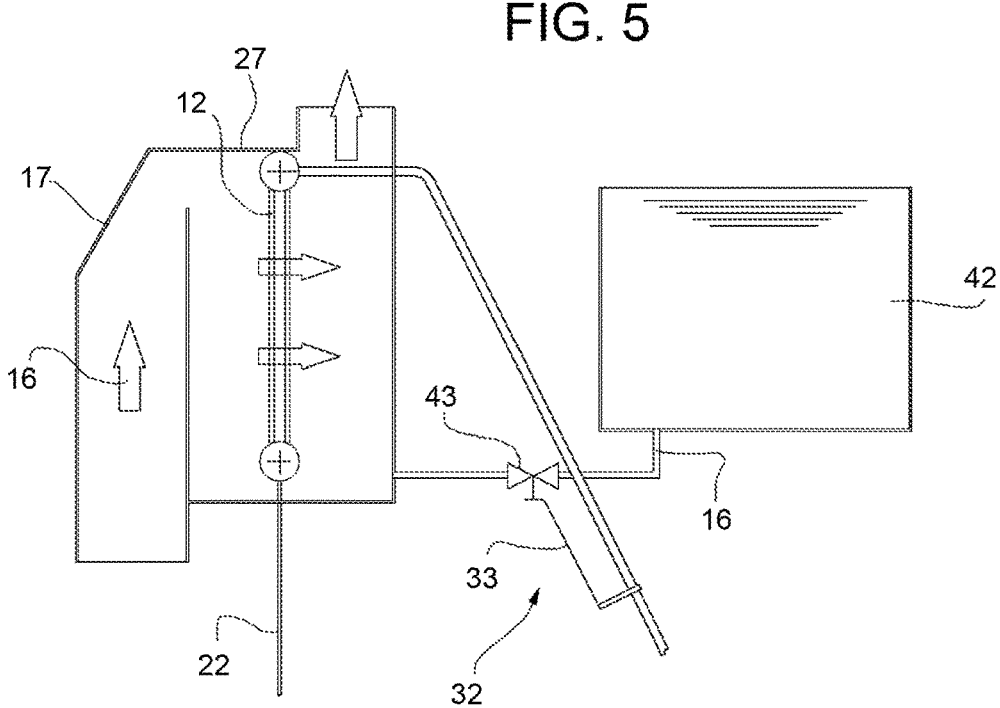

With respect to the embodiment of FIG. 4, the variation of FIG. 5 differs due to the fact that the containing and supporting structure 27 is shaped so as to both allow the circulation of air, and contain water, thus allowing the use of both air and water as an auxiliary fluid 16. In a condition of normal operation of the reactor, the heat exchanger 12 is cooled by air, which circulates through the structure 27. As the temperature of the primary fluid 5 increases, the actuator device 32 opens the valve 43; the auxiliary fluid 16 (water) is thus discharged from the tank 42, by effect of gravity, into the heat exchanger 12 increasing the performance thereof with a mixed air-water operation. When the reserve of auxiliary fluid 16 contained in the tank 42 becomes depleted, cooling of the heat exchanger 12 with air only is again possible.

Lastly, it is understood that further modifications and variations that do not depart from the scope of the attached claims can be made to the system for evacuating the residual heat from a nuclear reactor described and illustrated here.

The invention claimed is:

1. A system for evacuating residual heat from a nuclear reactor cooled by a primary fluid, the system comprising:
at least one first heat exchanger interacting with the primary fluid for transferring heat to a secondary fluid circulating in the at least one first heat exchanger;
at least one second heat exchanger connected to the at least one first heat exchanger via an evacuation circuit and in which the secondary fluid is cooled by an auxiliary fluid which passes through the at least one second heat exchanger circulating in a cooling duct; and
a control portion defined by a straight pipe portion extending along a rectilinear axis of a hot branch of the evacuation circuit, subject to thermal expansion by effect of the heating, caused by a temperature rise of the primary fluid beyond a preset threshold, of the secondary fluid in the control portion; and
a mechanical actuator device connected to the control portion, the mechanical actuator device operated by the thermal expansion of the control portion for opening the cooling duct and allowing the passage of the auxiliary fluid in the cooling duct and through the at least one second heat exchanger.

2. The system according to claim 1, wherein the straight pipe portion is thermally expandable along the rectilinear axis inside transverse guides, the straight pipe portion includes a proximal end, fixed to a manifold of the at least one second heat exchanger defining a fixed point of the system, and a distal end, axially generally opposite to the proximal end and connected to the mechanical actuator device.

3. The system according to claim 2, wherein the mechanical actuator device includes at least one tie rod, connected, at respective opposite longitudinal ends, respectively to the distal end of the straight pipe portion and to at least one movable member, movable to selectively open/close the cooling duct.

4. The system according to claim 3, wherein the at least one second heat exchanger is cooled by air in natural circulation and the movable member includes a shutter hinged to a support structure, housing the cooling duct, via a rotation shaft and arranged in the cooling duct for intercepting an air stream circulating in the cooling duct; the at least one tie rod connected to the shutter for causing the rotation and the opening of the shutter.

5. The system according to claim 3, wherein:
the at least one second heat exchanger is cooled by a liquid circulating in the cooling duct and discharged from a tank by effect of gravity at the opening of a valve positioned along the cooling duct; and
the movable member includes a shutter of said valve and the tie rod is connected to the shutter for causing the opening of the valve.

6. The system according to claim 5, wherein the at least one second heat exchanger is cooled by said liquid circulating in the cooling duct, and also cooled by air in natural circulation through the same cooling duct.

7. The system according to claim 1, wherein:
the secondary fluid includes boiling water in the at least one first heat exchanger and condensing superheated steam in the at least one second heat exchanger; and
the evacuation circuit is initially filled at a preset steam pressure.

8. The system according to claim 1, wherein the evacuation circuit is sealed and valveless.

9. The system according to claim 1, wherein the auxiliary fluid circulates in the cooling duct by natural circulation.

10. A system for evacuating residual heat from a nuclear reactor cooled by a primary fluid, the system comprising:
at least one first heat exchanger interacting with the primary fluid for transferring heat to a secondary fluid circulating in the at least one first heat exchanger;
at least one second heat exchanger connected to the at least one first heat exchanger via an evacuation circuit initially filled at a preset steam pressure and in which the secondary fluid is cooled by an auxiliary fluid which passes through the at least one second heat exchanger circulating in a cooling duct, wherein the second fluid includes boiling water in the at least one first heat exchanger and condensing superheated steam in the at least one second heat exchanger; and
a control portion, subject to thermal expansion by effect of the heating, caused by a temperature rise of the primary fluid beyond a preset threshold, of the secondary fluid in the control portion; and
a mechanical actuator device connected to the control portion, the mechanical actuator device operated by the thermal expansion of the control portion for opening the cooling duct and allowing the passage of the auxiliary fluid in the cooling duct and through the at least one second heat exchanger.

11. The system according to claim 10, wherein the control portion is defined by a straight pipe portion extending along a rectilinear axis of a hot branch of the evacuation circuit.

12. The system according to claim 11, wherein the straight pipe portion is thermally expandable along the rectilinear axis inside transverse guides, the straight pipe portion includes a proximal end, fixed to a manifold of the at least one second heat exchanger defining a fixed point of the system, and a distal end, axially generally opposite to the proximal end and connected to the mechanical actuator device.

13. The system according to claim 12, wherein the mechanical actuator device includes at least one tie rod, connected, at respective opposite longitudinal ends, respectively to the distal end of the straight pipe portion and to at least one movable member, movable to selectively open/close the cooling duct.

14. The system according to claim 13, wherein the at least one second heat exchanger is cooled by air in natural circulation and the movable member includes a shutter hinged to a support structure, housing the cooling duct, via a rotation shaft and arranged in the cooling duct for intercepting an air stream circulating in the cooling duct; the at least one tie rod connected to the shutter for causing the rotation and the opening of the shutter.

15. The system according to claim 13, wherein:
   the at least one second heat exchanger is cooled by a liquid circulating in the cooling duct and discharged from a tank by effect of gravity at the opening of a valve positioned along the cooling duct; and
   the movable member includes a shutter of said valve and the tie rod is connected to the shutter for causing the opening of the valve.

16. The system according to claim 15, wherein the at least one second heat exchanger is cooled by said liquid circulating in the cooling duct, and also cooled by air in natural circulation through the same cooling duct.

17. The system according to claim 10, wherein the evacuation circuit is sealed and valveless.

18. The system according to claim 10, wherein the auxiliary fluid circulates in the cooling duct by natural circulation.

* * * * *